United States Patent [19]

Brovelli

[11] 4,063,689
[45] Dec. 20, 1977

[54] RELEASABLE COUPLING DEVICE

[76] Inventor: Loredana Brovelli, 42, Corsa S. Gottardo, Milan, Italy, 20100

[21] Appl. No.: 729,017

[22] Filed: Oct. 4, 1976

[30] Foreign Application Priority Data

Oct. 31, 1975 Italy .................................. 28916/75

[51] Int. Cl.² ...................... B65H 75/30; B65H 79/00; D01H 3/16
[52] U.S. Cl. .................................. 242/46.5; 242/68.1
[58] Field of Search ............................ 242/46.5, 68.1; 279/1 C; 403/1, 2, 220–222; 192/103 R, 103 B, 105 A

[56] References Cited
U.S. PATENT DOCUMENTS

| 3,112,082 | 11/1963 | Altice | 242/46.5 |
| 3,272,447 | 9/1966 | Ewing et al. | 242/46.5 |

Primary Examiner—Leonard D. Christian
Attorney, Agent, or Firm—McGlew and Tuttle

[57] ABSTRACT

A coupling device for removably connecting a shaft or pin with a body by simple insertion into a body axial cavity, and for joining said body and shaft during controlled axial rotations of the latter, with a vibration damping and a clearance taking-up. Said device comprises one or more masses that are radially moved away from the body axis, during the rotations thereof, by the action of the centrifugal force, said masses controlling thrust elements that are correspondingly forced in a radial direction toward and against the shaft outer surface. Preferably, each mass is integral with a related thrust element, forming an axially directed tab oscillatably connected at the partition zone thereof with said body, and an array of tabs is circumferentially provided to define a body seat for the insertion of said shaft or pin.

8 Claims, 5 Drawing Figures

RELEASABLE COUPLING DEVICE

BACKGROUND OF THE INVENTION

1. Field of the invention

This invention relates to a coupling device adapted to reduce the vibrations and ensure a clearance taking-up in a removable coupling between a revolving body - in particular at high rotational speeds - and a shaft or pin, whereon said body is fitted and by which it is driven.

A typical but in no way restrictive example of a coupling as above referred to is that between a textile support, or better stated a support for threads or yarns, as e.g. a bobbin, a cop, a tube or the like, and the related spindle, whereon the textile support is axially slipped, to be then driven at high RPMs by the same spindle. Obviously, the need of easily slipping the textile support on and off the spindle requires to form, inside of the textile support, a seat for housing the spindle and allowing an engagement therewith, said seat showing a given clearance in respect of the spindle surface. On the other hand the need exists to reduce or in some cases to wholly remove such clearance up to a tight fit, whereby to prevent the arising of vibrations in the course of spindle rotations, as such vibrations are highly objectionable for the performance of the different operations, as well as for the mechanical component life.

2. Description of the prior art.

In order to simultaneously comply with said conflicting requirements, it is well known to form seats in the textile support, which are so dimensioned, in respect of the spindle, to attain a compromise between the requirement of having reduced vibrations and that of ensuring a relatively easy slipping of the textile support on and off the spindle. However, as it can be readily appreciated, such compromise solution is far from satisfactorily solving the considered problem and moreover it involves the need of manufacturing the concerned components with high accuracies, which results in production difficulties and high costs. In addition, the unavoidable wear of the mutually engaged components and in particular the spindle wear necessarily results in changes of the pre-established fits, with a clearance increase and therefore a material increase in the vibrations during the rotary motions.

As previously stated, such problem is encountered not only in the assumed case of textile supports, but also in all other cases wherein a releasable coupling is to be established between a body and a shaft or pin, both revolving at high rotational speeds.

SUMMARY OF THE INVENTION

Therefore, an object of this invention is to provide a coupling device adapted to reduce the vibrations and take-up the clearances in a coupling of the type referred to, as well as to allow for an easy slipping of the body into and off the shaft or pin, obviously when the same shaft is not driven, whilst when it is driven, in particular at very high rotational speeds, the vibrations of the whole assembly are efficiently reduced by the same device and in addition the possibly present coupling clearances are taken-up.

According to the present invention, the above advantageous features are attained by providing, in combination with said revolving body, one or more masses that can be moved away from the body axis under the action of the centrifugal force, as well as at least a centering means, controlled by the abovestated motion of said mass or masses and able to apply an array of forces against the outer surface of said shaft or pin, toward said axis and symmetrically thereto.

In particular, said centering means consists of a plurality of elements acting on the pin or shaft outer surface, symmetrically disposed in respect of the body axis and spaced therefrom, in order to define a seat for the shaft or pin wherein said shaft or pin can be easily introduced, seated and also taken off. However, according to an advantageous embodiment of this invention, said elements are resiliently and congruently movable in a radial direction toward the common axis of the assembly, thus symmetrically biasing the shaft outer surface. Each centering element is suitably controlled by a related mass, prefereably integral therewith so to form a tongue or a tab which is linked in an intermediate position thereof to a common circumferential base, in such a manner that such linking allows for a resilient oscillation of tabs under the action of the centrifugal force which is exerted onto the portion of each tab forming said controlling mass, the sizes and/or the weight of said portion being obviously greater than those of the tab portion forming the centering element.

DESCRIPTION OF THE PREFERRED EMBODIMENT

Figure 1:
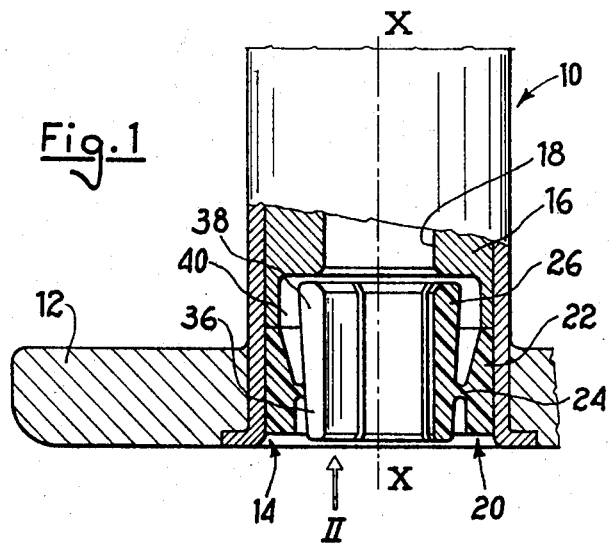
FIG. 1 is a part-sectional view of a bobbin for threads or yarns, having a coupling device for reducing the vibrations and taking-up the coupling clearances, said section being taken on a plane extending across the bobbin axis.
Figure 2:
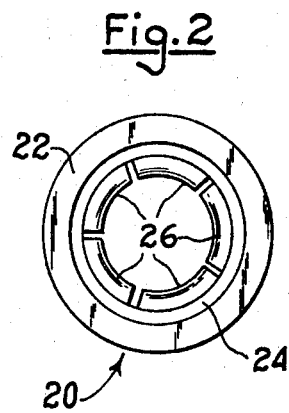
FIG. 2 is a partial plan view, in the direction of arrow II of FIG. 1.

As previously stated, an embodiment of this invention is shown in the accompanying drawings when used in combination with a textile support, or better stated a support for threads or yarns; however, it is to be clearly understood that the shown device could be used in many different fields of the technique.

Considering now the shown embodiment, a conventional bobbin or cop 10, possibly fitted with end flanges 12, has a tubular shape with an inner cavity 14 wherein an element 16 forming a seat 18 for the accomodation of a spindle, is housed.

One end of said bobbin inner cavity 14 carries a device 20 forming a seat for the accomodation of the spindle and simultaneously adapted to take-up the clearance and reduce the vibrations of the support-spindle assembly, when the same assembly is driven, particularly at higher RPMs.

Said device 20 shows a tubular portion 22 adapted to be firmly connected within the inner wall of support 10, e.g. by forcibly driving the cylindric outer wall thereof into the inner wall of support 10. From said firmly connected portion 22, a circumferential base 24 radially extends toward the inside of body 10 and carries at its inner end an array of tabs or fins 26, which extend substantially in both axial directions from said base 24. More detailedly, said tabs 26 are circumferentially and symmetrically arranged in respect of the revolving assembly axis X—X, whereby to define a seat whereinto a spindle 28 can be introduced and accomodated, leaving a narrow clearance 30 (see FIG. 3) between said tabs and the spindle when the assembly is in its rest condition, in order to allow for an easy insertion of body 10 on the spinle 28 and a likewise easy axial removal of same body therefrom. For making even more easy said operations, the outer ends of tabs 26 may be chamfered, as indicated by 32 and 34.

Two tab portions are defined in each tab 26 on both sides of the connection zone thereof with the common base 24, namely a first tab portion 36 extending on one side of the base 24 and forming a centering body having an axial size and/or a weight smaller than that of the second tab portion 38. Such second tab portion 38 forms a control mass which is drawn away from the axis X—X by the centrifugal force when the assembly is rotated, said motion being allowed by a suitable recess 40 surrounding the tab portions 38 and whereinto they can be accomodated.

Figure 3:
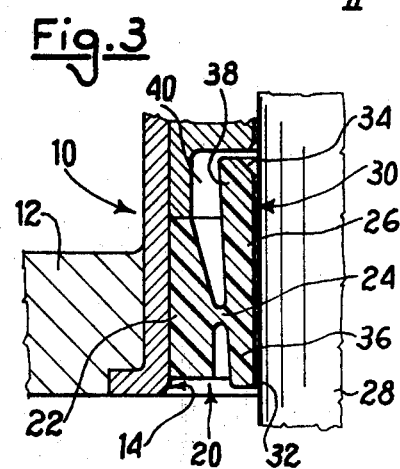
FIG. 3 is an axial section, similar to that of FIG. 1 and showing a detail of the coupling device in its rest condition, to allow for the insertion of the bobbin on a spindle and for the removal of the same bobbin therefrom.

The connection of tabs 26 to the base 24 allows a swinging motion of each tab about the connecting point, in such a manner as to substantially maintain the tab stiffness but to effect a tab resilient return toward the rest position at the end of the rotary motion, as shown in FIG. 3. Moreover, said base 24 should be very rigid, to prevent local deformations which would result in undesirable vibrations. In particular, the above conditions can be attained by manufacturing the device in a suitable thermoplastic material.

Figure 4:
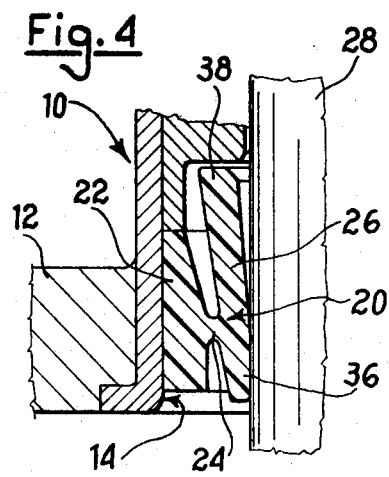
FIG. 4 is a section similar to that of FIG. 3, but showing the same coupling device in its operating condition, when the assembly is driven, for taking-up the clearances and reducing the vibrations.
Figure 5:
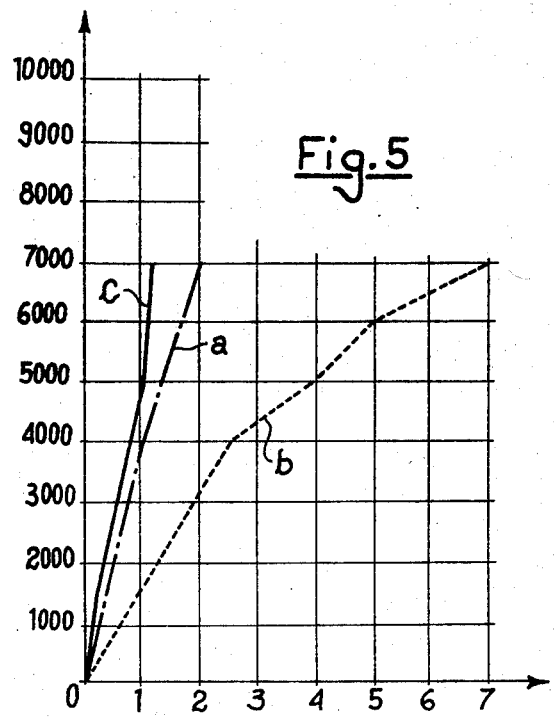
FIG. 5 is a graph showing the vibrations, in relation with the rotary speed, of a bobbin or cop fitted with said device and bobbins or cops without the same device.

Under the above stated structural conditions, when the assembly of body 10 and spindle 28 is driven at a high rotational speed about the axis X—X, the tabs tend to take the position as shown in FIG. 4, since the portions 38 thereof are driven away from the axis, due to the centrifugal force. Consequently, the tab portions 36 are urged toward the axis X—X and thus forced against the peripheral wall of spindle 28, thereby taking-up the clearances 30 and exerting on the same spindle a balanced and symmetrical array of forces, radially directed toward the axis X—X, by which the vibrations of the whole assembly can be substantially reduced.

These results have been confirmed by tests made on a bobbin having a height of 340 mm, a flange diameter of 127 mm and a weight of 3745 grams. Three different bores for the spindle were utilized in three bobbins of the above described type, and namely: (a) a bobbin with a bore diameter of 19.1 mm ; (b) a bobbin with a bore diameter of 19.4 mm; and (c) a bobbin with a bore diameter of 19.4 mm formed within the above described device. By driving the assembly at different RPMs on a spindle having a diameter of 19.05 mm, the maximum eccentricity value due to the vibrations was established on the flange opposite to the spindle foot, and the three curves designed by (a), (b) and (c) in the accompanying graph, respectively corresponding to bobbins (a), (b) and (c), were obtained. On the graph ordinate are the spindle RPMs, while the eccentricity of said flange can be read on the abscissa, in conventional units (of 0.125 mm). As it can be noticed from said diagram, sharp improvements were obtained, above all at the higher RPMs, even over the bobbin (a), which was fitted practically without clearance on the spindle.

While this invention has been described with reference to a preferred embodiment thereof, it is to be understood that many changes and modifications may be made therein without departing from the spirit and scope of the invention, and moreover that the same invention may be used also in technical fields different than that as specified in the described example.

I claim:

1. A device for reducing the vibrations and for taking-up the clearances in a releasable coupling between a revolving body subject to a centrifugal force and a rotatable member having an outer surface wherein said body is fitted and by which it is driven, said device comprising one or more movable masses associated with said revolving body and adapted to be radially driven away from the body axis under the action of the centrifugal force, and at least one centering means responsive to the motion of said mass or masses and thereby exerting on said outer surface an array of forces symmetrically directed toward said axis, said centering means comprising a plurality of thrust elements acting against said outer surface which are symmetrically located in respect to the axis of said body and so spaced therefrom to define a seat wherein said rotatable member can be easily introduced, housed and removed, said elements being resiliently and congruently movable in a radial direction toward the axis of said shaft or pin, to symmetrically bias said outer surface, each centering element being controlled by a related one of said masses, which is in turn urged away from the axis of the revolving body by the centrifugal force, a common supporting element mutually connecting each centering element and the related one of said masses, said supporting base circumferentially extending within said revolving body, and each centering element and related one of said masses comprising an elongated tab extending substantially in an axial direction and connected to said common base in order to form on either sides of the same base the centering element and the related control mass, respectively, the connection to said base allowing at least limited resilient oscillations of the tab about the connection zone up to the engagement of the centering element against the surface of said shaft or pin, the portion of said elongated tab defining said centering element having a bearing surface adapted to rest against said surface, and wherein the moment of inertia of said centering element tab portion, in respect of the shaft and revolving body assembly axis, is lower than that of the tab portion forming the related control mass, said control mass tab portion having a length and/or a weight greater than that of the centering element tab portion.

2. A coupling device for coupling a rotatable shaft to a revolving body such as a hollow bobbin cop, comprising a resilient coupling body having a tubular outer portion engageable into the hollow bobbin cop and having an inner ring portion of plurality of segment-shaped circumferentially separated tabs adapted to engage over the rotatable shaft, a thin connecting base disposed intermediate the length of said tubular outer portion and each of said tabs and interconnecting respective tabs with said tubular outer portion so that each of said tabs defines a lever like mass having a first portion extending in one axial direction from said base defining a first rotational mass, and a second portion extending in an opposite axial direction from said base defining a second rotational mass of a distinct magnitude from said first rotational mass so as to move during rotation in an outward direction and to cause the second portion to move in an inward direction to engage the rotatable shaft.

3. A coupling device according to claim 2 wherein said first tab portion is of a length greater than said second tab portion.

4. A coupling device according to claim 2 wherein said first tab portion is of a greater weight than said second tab portion.

5. A coupling device according to claim 2, wherein said device comprises an integral plastic part.

6. A device according to claim 1, wherein said common base extends in a plane substantially perpendicular to the revolving body axis and is rigidly and incompressibly connected to said body.

7. A device according to claim 1, wherein said base is integral with a cylindrical element, which is forced into an end cavity of said revolving body.

8. A device according to claim 1, wherein said revolving body is in the form of a bobbin or a support whereon a thread or yarn can be wound, while said shaft or pin is in the form of a spindle.

* * * * *